United States Patent
Chiodini

(10) Patent No.: US 6,269,247 B1
(45) Date of Patent: Jul. 31, 2001

(54) METHOD OF SPATIAL LOCATION OF A MOBILE STATION IN A CELL OF A COMMUNICATION NETWORK AND CORRESPONDING BASE STATION, MOBILE STATION AND SIGNALING PACKET

(75) Inventor: Alain Chiodini, Mountain View, CA (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/198,055

(22) Filed: Nov. 23, 1998

(30) Foreign Application Priority Data

Nov. 27, 1997 (FR) .................................................. 97 14906

(51) Int. Cl.⁷ ...................................................... H04Q 7/20
(52) U.S. Cl. ........................ 455/456; 455/446; 455/447; 455/449; 455/560; 455/561; 455/562
(58) Field of Search ................................... 455/447, 466, 455/446, 449, 561, 560, 562, 456; 343/909, 841

(56) References Cited

U.S. PATENT DOCUMENTS

| | | | |
|---|---|---|---|
| 5,400,043 | * 3/1995 | Arceneaux et al. | 343/872 |
| 5,513,378 | 4/1996 | Roy, III et al. | |
| 5,535,423 | * 7/1996 | Dupuy | 455/33.1 |
| 5,543,815 | * 8/1996 | Wu et al. | 343/909 |
| 5,767,789 | * 6/1998 | Afzali-Ardakani et al. | 340/825.54 |
| 5,844,894 | * 12/1998 | Dent | 370/330 |
| 5,917,458 | * 6/1999 | Ho et al. | 343/909 |
| 5,949,387 | * 9/1999 | Wu et al. | 343/909 |
| 5,987,335 | * 11/1999 | Knoedl, Jr. et al. | 455/561 |
| 6,026,304 | * 2/2000 | Hilsenrath et al. | 455/456 |

FOREIGN PATENT DOCUMENTS 2 706 232 A1   12/1994   (FR) .

* cited by examiner

Primary Examiner—Stella Woo
Assistant Examiner—Barry W. Taylor
(74) Attorney, Agent, or Firm—Sughrue, Mion, Zinn Macpeak & Seas, PLLC

(57) ABSTRACT

In a method for spatially locating a mobile station in a cell of a mobile radio network, the cell being of the type controlled by a base station with an omnidirectional antenna and divided into a plurality of angular sectors centered on the base station, a separate location signal element is allocated to each angular sector. The mobile station sends a signaling packet carrying all the location signal elements. For each angular sector the base station modifies the signaling packet sent by the mobile station before it is received by the omnidirectional antenna, the modification being specific to the angular sector. The base station determines the modification that has been made from the signaling packet received by the omnidirectional antenna and deduces from it the angular sector in which the mobile station is located. A corresponding base station with an omnidirectional antenna, mobile station and signaling packet are also disclosed.

12 Claims, 3 Drawing Sheets

BASE STATION

FARADAY CAGE

METHOD OF SPATIAL LOCATION OF A MOBILE STATION IN A CELL OF A COMMUNICATION NETWORK AND CORRESPONDING BASE STATION, MOBILE STATION AND SIGNALING PACKET

BACKGROUND OF THE INVENTION

1. Field of the Invention

The field of the invention is that of cellular mobile radio systems. To be more precise, the invention concerns the spatial location of a mobile station in a cell of a communication network with relatively good accuracy and in particular with sufficient accuracy for space division multiple access (SDMA) systems.

The invention applies to any cellular network, and in particular, although not exclusively, a GSM network.

To be more precise, the present invention concerns a method of spatial location of a mobile station moving in a cell of a communication network and a corresponding base station with omnidirectional antenna controlling the cell, mobile stations of the communication network and signaling.

2. Description of the Prior Art

A conventional mobile radio network comprises cells in each of which one or more mobile stations move around. Each cell is controlled by a base station. In this context the network can be any mobile radio network, in particular with regard to the shape and the number of cells.

In SDMA systems the cell is divided into a plurality of angular sectors centered on the base station. The base station must therefore be able to determine the angular sector containing a mobile station. In particular this enables the choice of a traffic channel (associated with a particular frequency) to be allocated to the mobile station.

An array of antennas is conventionally used associated with a specific algorithm, for example an ESPRIT type algorithm (Estimation of Signal Parameters via Rotational Invariance Techniques) or a MUSIC type algorithm (MUltiple SIgnal Classification).

The above prior art methods have the drawbacks of being complex, of requiring large volumes of computation and of using a plurality of antennas in each base station.

U.S. Pat. No. 5,508,707 describes a method of determining the geographical position of mobile stations sending an emergency call. The process disclosed comprises the following steps:

determining the contours (in terms of maximum and minimum error estimates) of the coverage areas of the base stations that can receive a call transmitted by a mobile unit to define a first bounding area that describes the relative position of the mobile unit;

determining which lobes (in an SDMA system) or which filters (in a non-SDMA system) of various base stations are in communication with the mobile unit to determine a second bounding area that describes the relative position of the mobile unit;

determining where the first and second bounding areas intersect so as to obtain a relatively precise description of the position of the mobile unit.

Accordingly, the above method necessitates a plurality of base stations.

What is more, the above method, like those described above, has the drawback of using an array of antennas to determine a precise location of the mobile station, which necessitates complex processing and represents a solution that is difficult to implement.

An objective of the invention is to mitigate the various drawbacks of the prior art.

To be more precise, a first objective of the invention is to provides a simple method of spatial location of a mobile station moving around in a cell and means associated with that method making it simple and easy to implement.

A complementary objective of the invention is to provide a method of the above kind that requires only one omnidirectional antenna in each base station.

Another objective of the invention is to provide a method of the above kind which optimizes the allocation of communication resources.

SUMMARY OF THE INVENTION

The above objectives, together with others that will become apparent hereinafter, are achieved in accordance with the invention by a method for spatially locating a mobile station in a cell of a mobile radio network, said cell being of the type controlled by a base station with an omnidirectional antenna wherein said cell is divided into a plurality of angular sectors centered on said base station, a separate location signal element is allocated to each angular sector, said mobile station sends a signaling packet carrying all of said location signal elements, and said base station comprises for each angular sector means for modifying the signaling packet sent by the mobile station before it is received by said omnidirectional antenna, said modification being specific to said angular sector, and means for determining, from the signaling packet received by said omnidirectional antenna, the modification made by one of said modifier means and for deducing therefrom the angular sector in which said mobile station is located.

The general principle of the invention is therefore to assign a distinct location signal element to each of said angular sectors of an SDMA cell so that the various angular sectors can be distinguished from each other.

Accordingly, the angular sector in which the mobile station is located is determined without using an array of antennas or complex calculations.

Note that the invention does not impose any restriction as to the nature of the location signal element.

Advantageously, each location signal element corresponds to a predetermined frequency range or frequency and said modifier means each perform filtering in accordance with the predetermined frequency range or frequency assigned to the angular sector for which said modifier means are operative.

In a preferred embodiment of the invention, said signaling packet transmitted by the mobile station is a reference signal the instantaneous frequency of which changes continuously over a given time period so as to take in succession all frequency values allocated to said angular sectors.

A reference signal of the above kind is generally called a "chirp" signal.

Advantageously, said reference signal is also used to synchronize said base station and said mobile station. This means that it is not necessary to add any additional hardware to the mobile station. A signal already provided by the mobile station is used for an additional function. Accordingly, implementing the present invention represents a low cost in the base station and a zero cost in the mobile stations. What is more, no additional signaling element is transmitted.

Advantageously, said location signal elements belong to the group comprising: frequencies, frequency ranges, specific combinations of at least two frequencies, and temporal sequences of specific frequencies.

Clearly the modifier means and the means for determining the modification are adapted to suit the type of locating signal element used.

Preferably, said mobile station transmits said signaling packet when setting up a call with said base station and/or periodically.

The invention also concerns a base station having an omnidirectional antenna and controlling a cell of a mobile radio network using the above method. A base station of the above kind includes, for each angular sector, means for modifying the signaling packet transmitted by said mobile station before it is received by said omnidirectional antenna, said modification being specific to said angular sector, and means for determining from the signaling packet received by said omnidirectional antenna the modification made by one of said modifier means and for deducing therefrom the angular sector in which said mobile station is located.

In other words the base station is provided, for each angular sector, with means adapted to modify the signaling packet in a fashion specific to the sector concerned. The signaling packet modified in this way is received by the omnidirectional antenna and other (determination) means determine the modifications made and therefore the angular sector in which the mobile station is located.

In a preferred embodiment, the modifier means each comprise filter means responsive to the predetermined frequency range or frequency assigned to the angular sector for which said modifier means are operative.

More generally, the modifier means can each comprise a battery of logic gates, a comparator, a filter, a level detector, combination of the above or other units, etc.

Advantageously, the filter means each comprise a grid forming one side of a Faraday cage surrounding said omnidirectional antenna and having the same number of sides as there are angular sectors, the mesh of said grid assuring high-pass filtering according to the predetermined frequency range or frequency assigned to the angular sector for which said modifier means are operative.

In one particular embodiment, said means for determining the modification made to the transmitted signal from the signaling packet received by said omnidirectional antenna comprise the same number of correlation means as there are angular sectors, the correlation means each supplying information indicating the presence or the absence of one of said location signal elements in said received signaling packet and means for deciding the angular sector in which said mobile station is located in accordance with presence or absence information provided by said correlation means.

The correlation means of a given angular sector detect the presence or the absence in the modified signaling packet of the location signal element associated with the given angular sector, for example.

The invention further consists in a mobile station for a mobile radio network including at least one cell controlled by a base station and using the method of the invention. A mobile station of this kind comprises means for transmitting to said base station a signaling packet carrying all said location signal elements.

The invention further consists in the signaling packet as such that is transmitted by said mobile station and comprises all said location signal elements.

In a preferred embodiment, a specific frequency band or frequency being assigned to each angular sector, said signaling packet comprises a chirp signal the instantaneous frequency of which evolves continuously in time so as to take all of said specific frequencies successively.

Many other types of signal can also be used, for example a signal having the form of a staircase function, what is essential being that the signal takes at least once all of the specific frequencies.

Other features and advantages of the invention will become apparent upon reading the following description of a preferred embodiment of the invention given by way of illustrative and non-limiting example and with reference to the accompanying drawings.

DETAILED DESCRIPTION OF THE PREFERRED EMBODIMENTS

The invention therefore concerns a method of spatially locating a mobile station moving in a cell of a communication network and means for implementing the method.

The means for implementing the method are included in the mobile station to be located and in each base station with an omnidirectional antenna controlling a separate cell of the mobile radio network.

Figure 1:
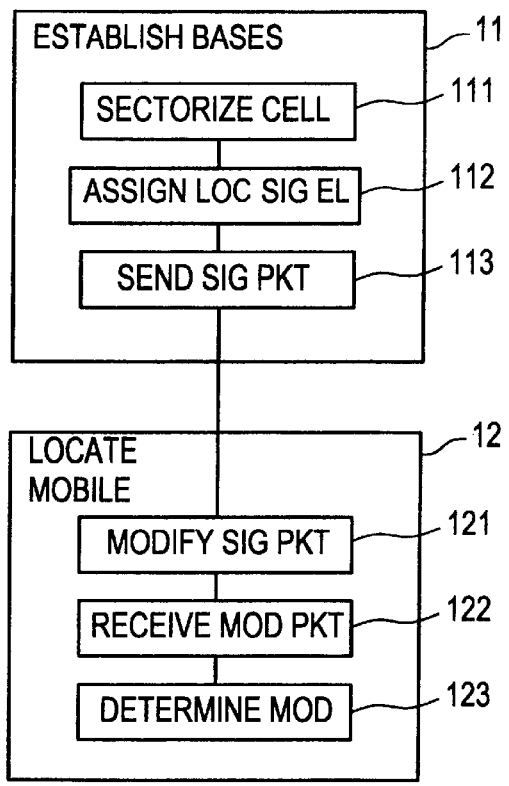
FIG. 1 is a simplified flowchart of one particular embodiment of the method of the invention.

One particular embodiment of the method of the invention for locating a mobile station in a cell of a mobile radio network, the cell being of the type controlled by a base station having an omnidirectional antenna, will now be described with reference to the FIG. 1 flowchart. The method comprises the following successive steps:

a preliminary step 11 of setting up bases for locating the mobile station and divided into three successive sub-steps in which:

the cell is divided (111) into a plurality of angular sectors centered on the base station;

a separate location signal element is assigned (112) to each angular sector;

the mobile station transmits (113) a signaling packet containing all of the location signal elements;

a step 12 of locating the mobile station which is divided into three successive sub-steps in which:

means in the base station specific to each angular sector modify (121) the signaling packet transmitted by the mobile station; the modified signaling packet carries a modification ("imprint") specific to the angular sector traversed;

the omnidirectional antenna receives (122) the modified signaling packet; and means in the base station determine (123) the modification made to the transmitted signaling packet (i.e. the modification carried by the modified signaling packet) in order to designate the angular sector in which the mobile station is located.

The location signal element corresponds to a predetermined frequency range or frequency, for example.

The mobile station transmits the signaling packet when setting up a call to the base station and/or periodically, for example.

Figure 2:
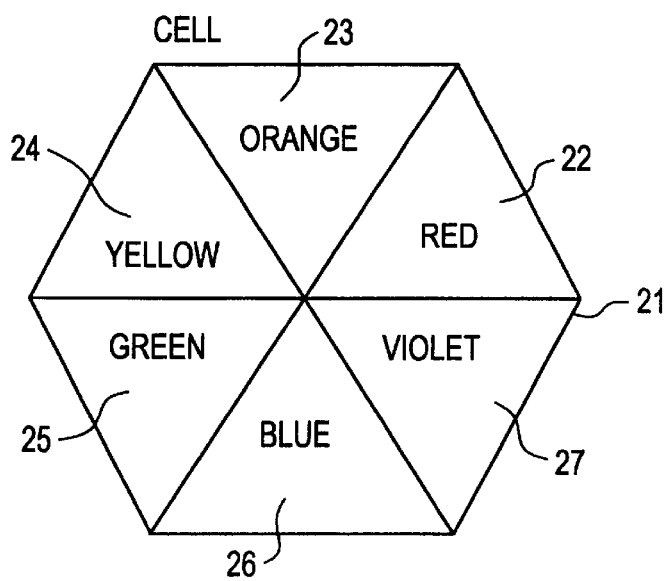
FIG. 2 is a diagram of a sectorized cell used to explain the operation of a base station employing the process from FIG. 1 by means of an example.

As shown in the FIG. 2 diagram a cell 21 comprises six angular sectors 22 through 27, for example. The angular sectors are triangular, for example, one of the apices corresponding to the center of the hexagon, for example, at which point the associated base station is located.

For easier understanding, in the remainder of the description each of the angular sections 22 through 27 is associated with a separate color, namely red, orange, yellow, green, blue and violet, respectively.

It should be understood that the color code is used only for illustrative purposes. In practice each color corresponds to a frequency range or frequency, for example.

Furthermore, and also with the aim of simplicity, each of the angular sectors 22 through 27 is associated with an orientation relative to the center of the cell 21, namely north-east, north, north-west, south-west, south and south-east, respectively.

Clearly the subdivision can be more refined (narrower angular sectors) to determine a more precise position of the mobile station. In other words, the greater the number of sectors the more precise the position of the mobile station.

Of course, the cell and the angular sectors that constitute it can have any shape.

To initiate a call the mobile station sends a specific signaling packet, for example on the Random Access CHannel (RACH) in GSM systems.

Figure 3:
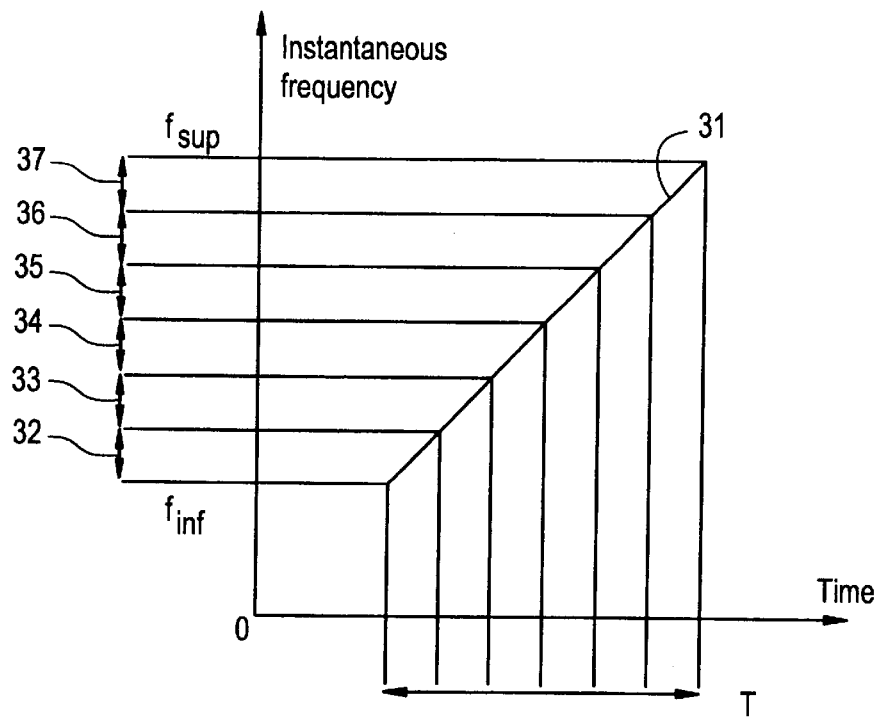
FIG. 3 shows one embodiment of a signaling packet in accordance with the invention.

In accordance with the invention, the above packet is associated with another signaling packet which includes, for example, a chirp signal 31 whose instantaneous frequency evolves linearly with time, as shown in FIG. 3. This chirp signal is transmitted during a time interval T.

The equation of the chirp signal is:

$$S_{chirp}(t)=\cos(2.\pi.(f_{sup}-f_{inf}).t^2/T)$$

$f_{sup}$ being the instantaneous upper frequency transmitted by the chirp signal, $f_{inf}$ being the instantaneous lower frequency transmitted by the chirp signal, and T being the time interval during which the chirp signal is transmitted.

In an advantageous variant the same chirp signal can also be used to synchronize the mobile station. Patent document FR 2 706 232 describes this use of the chirp for synchronization.

Accordingly, using a single signal for two functions (synchronization and location) has the following advantages:

no additional hardware is needed, and no additional (transmitted or received) signal is needed.

Note that the aforementioned advantages hold good, generally speaking, for any signal which, like the chirp signal, provides two separate synchronization and location functions. It is nevertheless clear that synchronization can be achieved by any other means independent of the chirp signal.

The frequency excursion of the chirp signal can be divided into the same number of identical frequency segments (each corresponding to one color) as there are angular sectors to be distinguished in a cell. Consequently, each chirp segment can be associated with an angular sector by means of the aforementioned "color code".

The shape of the curve of the chirp signal is naturally not limited to a straight line 31. The curve can also be in the form of a staircase, for example. Generally speaking, this signal must sweep all frequencies from the lower limit $f_{inf}$ to the upper limit $f_{sup}$, passing through the various frequency ranges 32 through 37, so as to take all frequency values assigned to the various angular sectors.

Each of the various frequency ranges 32 through 37 is associated with a color, for example red, orange, yellow, green, blue, violet, respectively.

Note that in the present example the change from a frequency range corresponding to one color to a previous or subsequent frequency range corresponding to a different color is continuous.

In a variant it can be discontinuous with a gap (regular or irregular) between each range or feature a mix of continuous and discontinuous changes between the ranges.

One particular embodiment of the base station of the invention will now be described with reference to FIG. 4.

Figure 4:
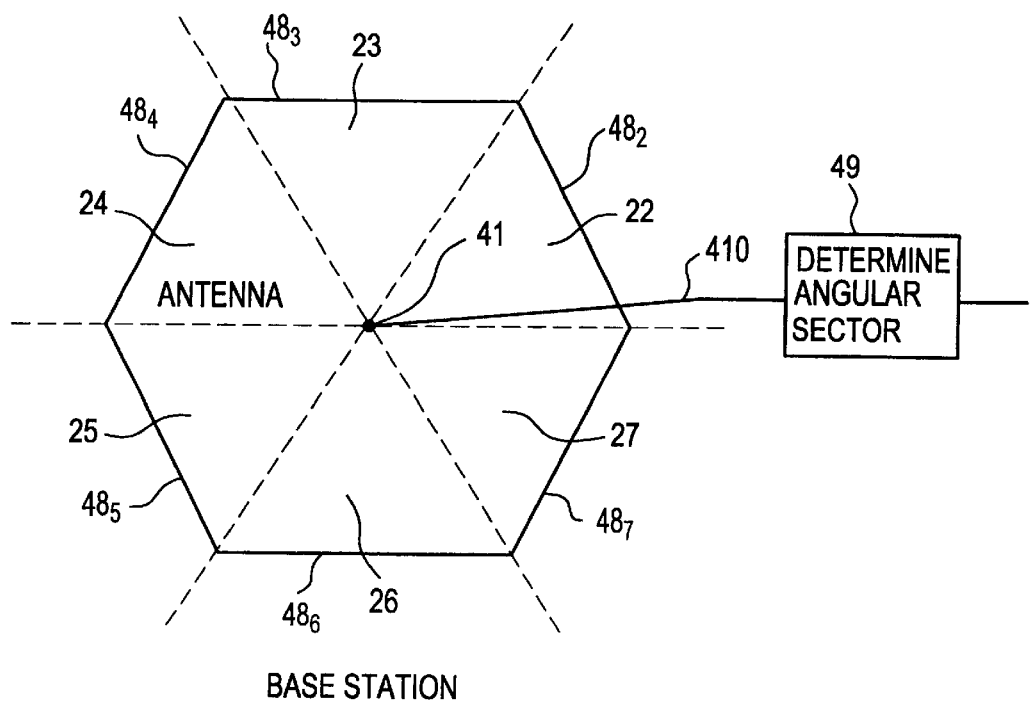
FIG. 4 is a simplified diagram of one particular embodiment of the base station of the invention.

As shown in FIG. 4, in order to implement the present invention, the base station comprises (for example) six modifier means $48_2$ through $48_7$ (one for each angular sector), a single receive antenna consisting of a vertical omnidirectional whip antenna 41, for example, and means 49 for determining the angular sector in which the mobile station is located.

An angular sector is associated with modifier means specific to it. Accordingly, the base station described here by way of example comprises six different modifier means capable of transforming the signaling packet transmitted by the mobile station in six different ways. The modifier means each receive the signaling packet transmitted by the mobile station and convert it to leave a specific "trace" identifying the angular sector with which it is associated.

Each modifier means assures filtering depending on the predetermined frequency range or frequency assigned to the angular sector for which the modifier means are operative.

The omnidirectional antenna receives from one of the angular sectors signaling packet previously converted by the modifier means associated with the angular sector concerned.

The transformed signaling packet is then fed to the determination means 49. Following processing, the means 49 determine what modification has been made to the signaling packet transmitted and thus the angular sectors from which the signaling packet transmitted by the mobile station came (i.e. the one in which the mobile station is located).

Figure 5:
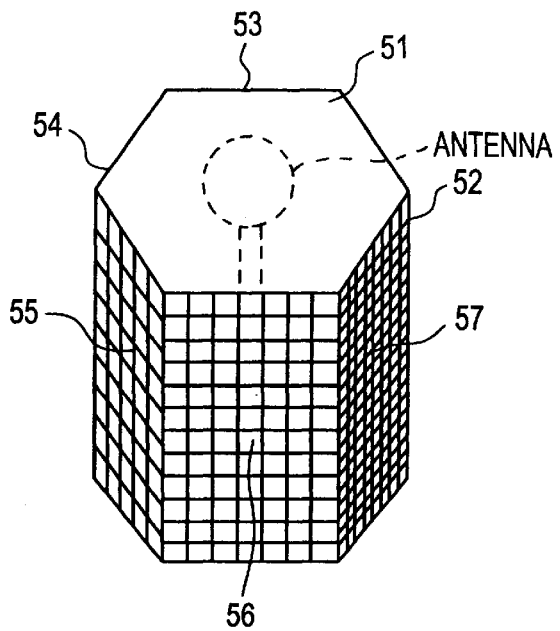
FIG. 5 is a perspective view of one particular set of means for modifying a signaling packet included in the base station from FIG. 4.

As shown in FIG. 5, in one particular embodiment the means 48 comprise a Faraday cage 51. The filter means employed are then specific to the structure of the flats of the Faraday cage. Each side of the Faraday cage is formed by a grid 52 through 57 the meshes of which have dimensions that depend on the frequency to the filtered (for example dimensions of λ/4). A structure of the above kind then serves as a high-pass filter passing frequencies from (and including) the frequency (or frequency range) associated with the angular sector concerned.

This is clearly apparent in table I below which specifies, for each sector, a filter example using the color code previously referred to. The dimensions of the meshes are different from one flat to another, indicating different filtering according to the side of the Faraday cage through which the signaling packet passes.

Referring to table I, if the signaling packet transmitted passes through the north-west grid, for example, only the colors yellow, green, blue and violet are not filtered. In other words, the colors red and orange are filtered. Consequently, if it passes through the north-west grid, the signaling packet transmitted is modified and then comprises only the frequency ranges or frequencies corresponding to the colors yellow, green, blue and violet.

TABLE I

| Grid | Filter red? | Filter orange? | Filter yellow? | Filter green? | Filter blue? | Filter violet? |
|---|---|---|---|---|---|---|
| NE | NO | NO | NO | NO | NO | NO |
| N | YES | NO | NO | NO | NO | NO |
| NW | YES | YES | NO | NO | NO | NO |
| SW | YES | YES | YES | NO | NO | NO |
| S | YES | YES | YES | YES | NO | NO |
| SE | YES | YES | YES | YES | YES | NO |

Figure 6:
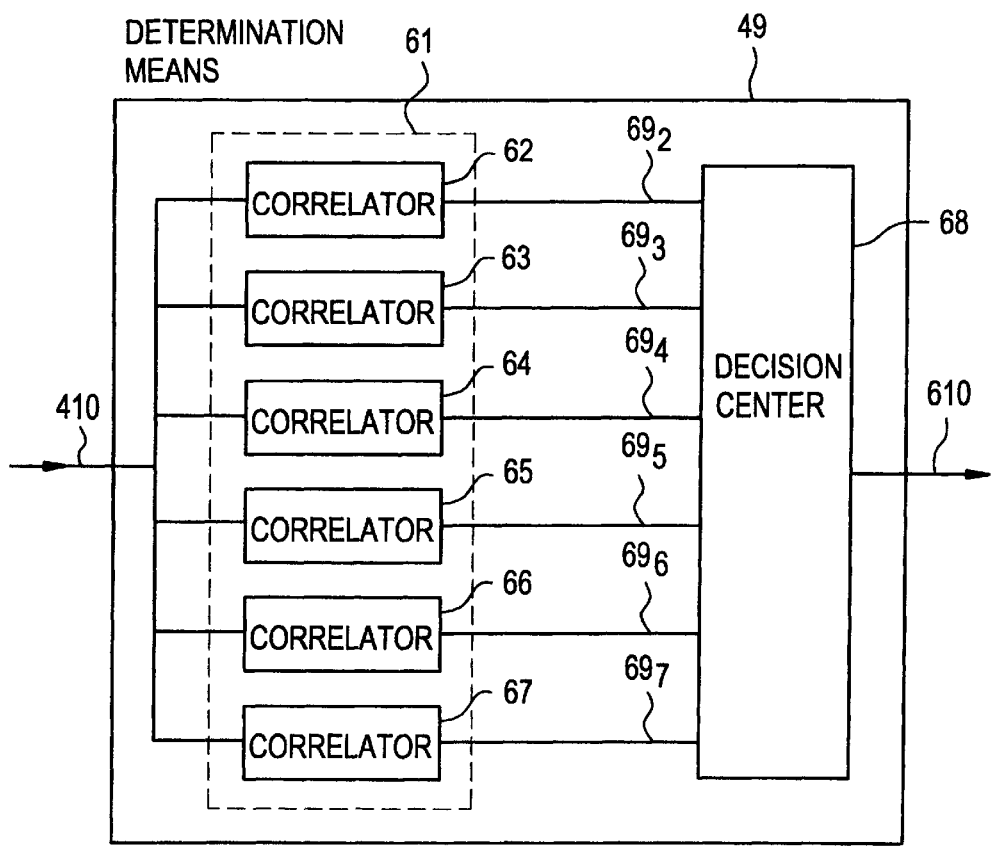
FIG. 6 is a simplified diagram of one particular embodiment of the means included in the base station from FIG. 4 for determining the modification that has been made.

One particular embodiment of the determination means 49 will now be described with reference to FIG. 6. The means 49 comprise a set 61 of correlators 62 through 67 and a decision center 68. The number of correlators corresponds to the number of angular sectors. Each correlator detects the presence or the absence of the color associated with an angular sector in the modified signaling packet and sends to the decision center 68 a signal $69_2$ through $69_7$ indicating the respective corresponding result. Accordingly, the correlators 62 through 67 respectively detect the presence or the absence of the colors red, orange, yellow, green, blue and violet. In this example the decision center 68 therefore receives six signals. The decision center 68 then analyzes those signals and decides the angular sector in which the mobile station is moving from a predetermined grid of responses shown in table II below.

TABLE II

| Signal received (modified signaling packet) | Red present? | Orange present? | Yellow present? | Green present? | Blue present? | Violet present? | Designated angular sector |
|---|---|---|---|---|---|---|---|
| CASE 1 | YES | YES | YES | YES | YES | YES | NE |
| CASE 2 | NO | YES | YES | YES | YES | YES | N |
| CASE 3 | NO | NO | YES | YES | YES | YES | NW |
| CASE 4 | NO | NO | NO | YES | YES | YES | SW |
| CASE 5 | NO | NO | NO | NO | YES | YES | S |
| CASE 6 | NO | NO | NO | NO | NO | YES | SE |

The various colors are detected by means of the correlation between the received signal corresponding to the transformed signaling packet and each of the reference colors.

For example, if the signals at the output of the correlators 62 through 67 advise the decision center 68 that the colors red and orange are absent and the colors yellow, green, blue and violet are present, the decision center 68 deduces from this that case N° 3 of table II applies and therefore that the mobile station is in the north-west sector. This result is then available on the signal 610 delivered at the output from the decision process.

The function of the decision center 68 can be implemented by a microprocessor or a microcontroller, for example.

A reading of the above description shows that the present invention proposes a simple, high-performance process that is easy to implement.

There is claimed:

1. A method for spatially locating a mobile station in a cell of a mobile radio network, said cell being of the type controlled by a base station with an omnidirectional antenna, said cell being divided into a plurality of angular sectors centered on said base station, said method comprising:
   allocating a separate location signal element to each angular sector;
   said mobile station sending a signaling packet carrying all location signal elements for said cell;
   for each angular sector, modifying the signaling packet sent by the mobile station before it is received by said omnidirectional antenna, said modifying being specific to said each angular sector;
   determining, from the modified signaling packet received by said omnidirectional antenna, the modification made; and
   deducing, from said modification made, the angular sector in which said mobile station is located.

2. A spatial location method as claimed in claim 1, wherein each allocated location signal element corresponds to a different predetermined frequency range or frequency, and wherein said modifying specific to each angular section includes filtering said signaling packet in accordance with the predetermined frequency range or frequency assigned to the angular sector.

3. A spatial location method as claimed in claim 1 wherein said signaling packet transmitted by said mobile station is a reference signal the instantaneous frequency of which changes continuously over a given time period so as to include in succession all frequency values allocated to said angular sectors.

4. A spatial location method as claimed in claim 3 wherein said reference signal is also used to synchronize said base station and said mobile station.

5. A spatial location method as claimed in claim 1 wherein said location signal elements belong to the group comprising frequencies, frequency ranges, specific combinations of at least two frequencies, and temporal sequences of specific frequencies.

6. A spatial location method as claimed in claim 1 wherein said mobile station transmits said signaling packet when setting up a call with said base station.

7. A spatial location method as claimed in claim 1 wherein said mobile station transmits said signaling packet periodically.

8. A spatial location method as claimed in claim 1 wherein said mobile station transmits said signaling packet when setting up a call with said base station and periodically thereafter.

9. A base station having an omnidirectional antenna and controlling a cell of a mobile radio network, said cell being subdivided into a plurality of angular sectors centered on said base station and to each of which a separate location signal element is assigned, a mobile station transmitting a signaling packet carrying all of said location signal elements, said base station comprising:

for each angular sector, means for modifying the signaling packet transmitted by said mobile station before it is received by said omnidirectional antenna, said modification being specific to said angular sector; and means for determining from the signaling packet received by said omnidirectional antenna the specific modification made by said modifier means and for deducing therefrom the angular sector in which said mobile station is located.

10. A base station as claimed in claim 9 wherein, for each angular sector, said modifying means comprise separate filter means responsive to a respective predetermined frequency range or frequency assigned to the corresponding angular sector.

11. A base station according to claim 10 wherein said filter means each comprise a grid forming one side of a Faraday cage surrounding said omnidirectional antenna, the Faraday cage having the same number of sides as there are angular sectors, the mesh of each said grid assuring high-pass filtering according to the respective predetermined frequency range or frequency assigned to said corresponding angular sector.

12. A base station as claimed in claim 9 wherein said means for determining the specific modification made comprise:

the same number of correlation means as there are angular sectors, said correlation means each supplying information indicating the presence or the absence of one of said location signal elements in said received signaling packet; and means for deciding the angular sector in which said mobile station is located in accordance with presence or absence information provided by said correlation means.

* * * * *